(12) United States Patent
Koya et al.

(10) Patent No.: US 6,691,756 B2
(45) Date of Patent: Feb. 17, 2004

(54) PNEUMATIC TIRE WITH SPECIFIED BEAD BASE SURFACE

(75) Inventors: Mitsuharu Koya, Kobe (JP); Yoshiyuki Takada, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 10/150,087

(22) Filed: May 20, 2002

(65) Prior Publication Data
US 2002/0189739 A1 Dec. 19, 2002

(30) Foreign Application Priority Data
May 21, 2001 (JP) .......................... 2001-151324

(51) Int. Cl.[7] .................. B60C 15/02; B60C 15/024; B60C 15/04
(52) U.S. Cl. .................. 152/540; 152/539; 152/544
(58) Field of Search .................. 152/539, 544, 152/540

(56) References Cited

U.S. PATENT DOCUMENTS

| 5,232,032 A | 8/1993 | Diernaz |
| 5,323,830 A | 6/1994 | Diernaz |
| 5,772,811 A * | 6/1998 | Ueyoko et al. ......... 152/544 X |

FOREIGN PATENT DOCUMENTS

| EP | 0 640 500 A1 | 3/1995 |
| EP | 0 958 946 A2 | 11/1999 |
| WO | WO 00/26044 | 5/2000 |

OTHER PUBLICATIONS

Patent Abstracts of Japan, vol. 017, No. 610 (M–1508), Nov. 10, 1993 & JP 05 185811 A (Bridgestone Corp), Jul. 27, 1993.

* cited by examiner

Primary Examiner—Adrienne C. Johnstone
(74) Attorney, Agent, or Firm—Birch, Stewart, Kolasch & Birch, LLP

(57) ABSTRACT

A pneumatic tire to be mounted on a 15-degree-taper rim comprises a pair of bead portions each with a bead core, wherein in a meridian section of the tire under a state that the tire is not mounted on the rim but the bead portions are held such that the bead width is equal to the rim width of the 15-degree-taper rim, the bead base surface of each bead portion, which is defined as extending between a bead heel and a bead toe, is substantially straight and inclined at an angle of from 22 to 26 degrees with respect to the tire axial direction, and a ratio La/Lb of the axial width La of the bead base surface to the maximum width Lb of the bead core is in a range of from 1.3 to 1.6.

4 Claims, 3 Drawing Sheets

PNEUMATIC TIRE WITH SPECIFIED BEAD BASE SURFACE

BACKGROUND OF THE INVENTION

1. Field of the Invention

The present invention relates to a pneumatic tire, more particularly to a bead structure adapted for a 15-degree-taper rim.

2. Description of Related Art 15-degree-taper center-drop rims are widely used as suitable for pneumatic tires for heavy duty use such as for trucks, buses and the like because a large engaging force is produced between the tire beads and rim bead seats as the tire is inflated.

In such tires, although the rim bead seat is provided with a single taper of 15 degrees, the tire bead base is, as shown in FIG. 3 by a dashed line, often provided with a double taper of about 21 degrees and 31 degrees (parts b1 and b2) in order to improve contact between the rim bead seat and the tire bead base which provides airtightness necessary for inflating the tire during mounting operation (initial inflation).

In case of this double tapered bead base (b1 and b2), as the inside diameter at the bead toe (P2) becomes small, the bead toe gets stuck with a rim flange and tends to chip off when the bead portion goes over the rim flange during mounting the tire on the rim. On the other hand, in order to obtain a large engaging force, it is necessary for the rubber beneath the bead core to relatively decrease its thickness. This is however, liable to cause cracks in this portion during long-term use.

SUMMARY OF THE INVENTION

It is therefore, an object of the present invention to provide a pneumatic tire in which bead damage such as bead toe chip-off and cracks can be prevented without sacrificing airtightness and rim mounting operation.

According to the present invention, a pneumatic tire to be mounted on a 15-degree-taper rim, comprises a tread portion, a pair of sidewall portions, a pair of bead portions each with a bead core therein, and a carcass comprising a ply of steel cords extending between the bead portions through the tread portion and sidewall portions, wherein in a meridian section of the tire under a state that the tire is not mounted on a rim but the bead portions are held such that the bead width is equal to the rim width of the 15-degree-taper rim, the bead base surface of each bead portion, which is defined as extending between a bead heel and a bead toe, is substantially straight and inclined at an angle of from 22 to 26 degrees with respect to the tire axial direction, and a ratio La/Lb of the axial width La of the bead base surface to the maximum width Lb of the bead core is in a range of from 1.3 to 1.6.

BRIEF DESCRIPTION OF THE DRAWINGS

Embodiment of the present invention will now be described in detail in conjunction with the accompanying drawings.

DETAILED DESCRIPTION OF THE INVENTION

Figure 1:
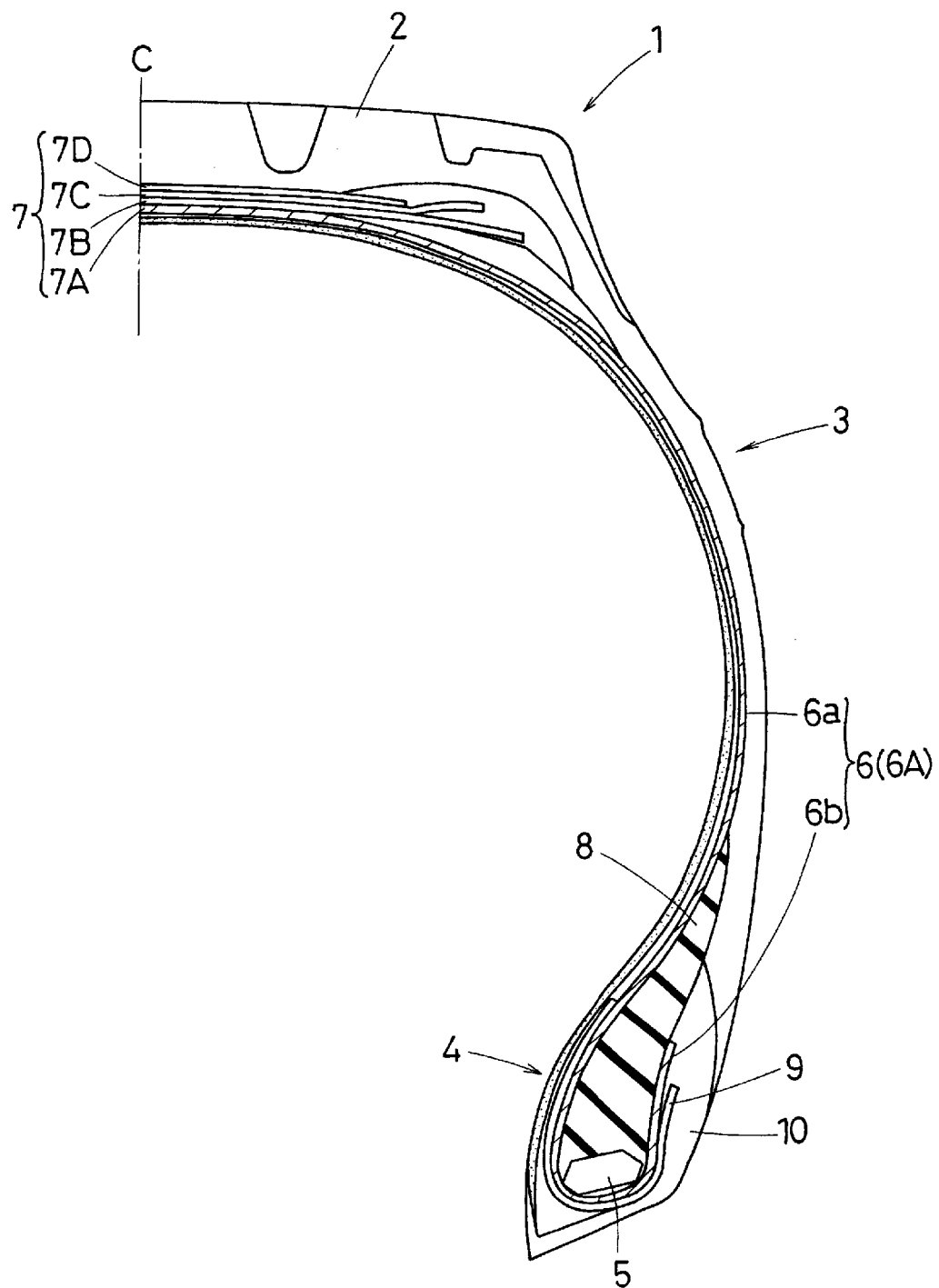
FIG. 1 is a cross sectional view of a pneumatic tire according to the present invention.

In the drawings, pneumatic tire 1 according to the present invention comprises a tread portion 2, a pair of axially spaced bead portions 4 each with a bead core 5 therein, a pair of sidewall portions 3 extending between the tread edges and the bead portions 4, a carcass 6 extending between the bead portions 4, and a belt 7 disposed radially outside the carcass 6 in the tread portion 2. The tire 1 is to be mounted on a 15-degree-taper rim without a tire tube. The tire 1 as an embodiment of the present invention is a heavy duty radial tire for trucks and buses.

The belt 7 comprises two cross breaker plies. In case of heavy duty use, the belt 7 is usually composed of three or four breaker plies. Thus, in this embodiment, the belt 7 is composed of four breaker plies: a radially innermost ply 7A of steel cords laid at an angle of from 50 to 70 degrees, and radially outer plies 7B, 7C and 7D of steel cords laid at an angle of not more than 30 degrees with respect to the tire equator. Incidentally, it is possible that the belt includes a band ply whose cord angle is substantially zero with respect to the tire equator.

The carcass 6 comprises at least one ply 6A of cords arranged radially at an angle of 90 to 70 degrees with respect to the tire equator, and extending between the bead portions 4 through the tread portion 2 and sidewall portions 3, and turned up around the bead core 5 in each bead portion 4 from the inside to the outside of the tire so as to form a pair of turned up portions 6b and one main portion 6a therebetween. In this example, the carcass 6 is composed of a single ply 6A of steel cords arranged at 90 degrees.

Between the carcass ply main portion 6a and turned up portion 6b in each of the bead portions 4, there is disposed a bead apex rubber 8 which extends radially outwards from the bead core 5 while tapering towards its radially outer end.

The bead portions 4 are each provided with a bead reinforcing cord layer 9 which is folded around the bead core 5 in a U-shape so as to extend radially outwardly along the axially inside of the carcass main portion and the axially outside of the carcass turned up portion. The bead reinforcing cord layer 9 in this example is made of steel cords laid side-by-side.

The bead core 5 is formed by winding a high-modulus cord or wire such as steel wire into a specific cross sectional shape. In this example, the cross sectional shape is a hexagon which is elongated in a direction substantially parallel to the bead base surface SA so that the radially inner side of the hexagon becomes substantially in parallel to the bead seat of the wheel rim, namely, inclined at 15 degrees when the tire is mounted thereon. The maximum width Lb of the bead core occurs in this direction inclined at 15 degrees when the tire is mounted on the rim.

Further, the bead portions 4 each comprise a chafer 10 made of a hard rubber having a JIS durometer A hardness of 75 to 85. The chafer 10 is disposed along a surface of the bead portion 4 which comes into contact with the wheel rim when the tire is mounted thereon. Thus, the chafer 10 comprises at least a base portion 10A defining the bead base surface SA and an axially outer portion 10B defining the axially outer surface SB of the bead portion.

Figure 2:
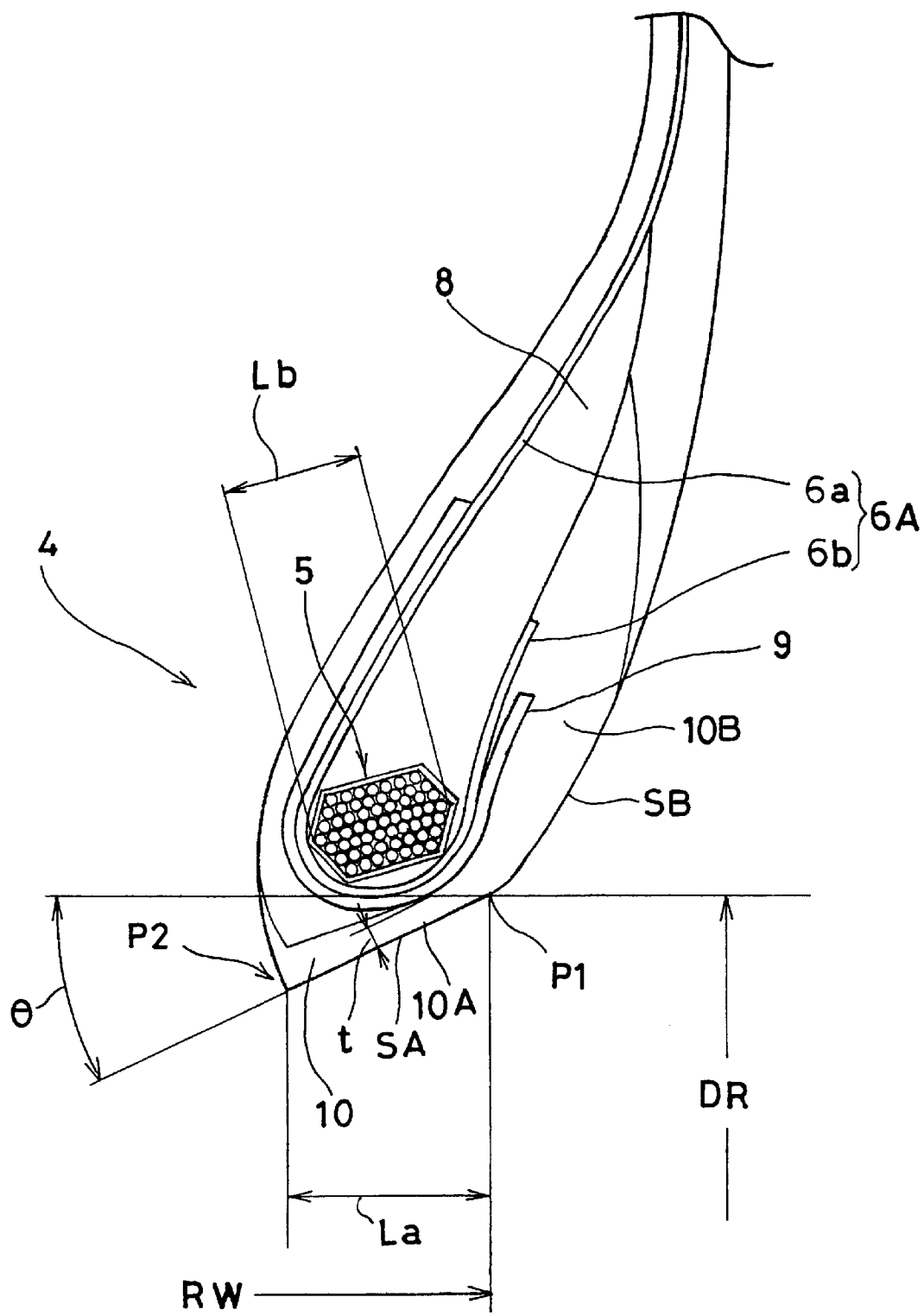
FIG. 2 is an enlarged cross sectional view of the bead portion thereof.

In a state that the tire is not mounted on a rim but the bead width or the distance between the bead heels P1 is set to be the same as the rim width RW of the wheel rim, the bead base surface SA is, as shown in FIG. 2, substantially straight and inclined at an angle θ of from 22 to 26 degrees preferably 23 to 25 degrees with respect to the tire axial direction. The bead base surface SA is defined as extending between the bead heel P1 and bead toe P2 and comes into contact with the bead seat surface of the wheel rim. The bead heel P1 is a point on the tire surface at a position corresponding to the wheel rim diameter when the tire is mounted on the rim. In the above-mentioned state, however, the diameter DR at the position of the bead heel P1 is slightly (0.4 to 0.8%) smaller than the wheel rim diameter.

In order to prevent the bead base surface SA from being cracked, the minimum of the rubber thickness (t) beneath the bead core 5 is set in a range of 1.8 to 3.0 mm. Here, the rubber thickness (t) is defined as the shortest distance from a point on the bead base surface SA to the adjacent cord layer, wherein the adjacent cord layer is the bead reinforcing cord layer 9 in this embodiment. But if this layer 9 is not provided, the carcass becomes the adjacent cord layer. If an additional cord layer is disposed outside the bead reinforcing cord layer 9, then the additional cord layer may be the adjacent cord layer.

In the above-mentioned structure, it is also important that, as shown in FIG. 2, the ratio La/Lb of the axial width La of the bead base surface SA to the maximum width Lb of the bead core 5 is set in a range of from 1.3 to 1.6, difficult to control bead toe damage and to improve rim mounting performance.

If La/Lb becomes less than 1.3, it becomes difficult to improve rim mounting performance. If La/Lb becomes more than 1.6, it becomes difficult to improve rim mounting performance and bead toe damage.

COMPARISON TESTS

Test tires having the structure shown in FIG. 1 and the specifications shown in Table 1 were made and the following tests were conducted.

1) Rim mounting test

Using a hydraulic tire changer, we examined whether the test tire could be mounted on a wheel rim or not. The results are shown in Table 1 wherein "Y" indicates that the tire could be mounted, and "N" indicates "could not".

2) Airtightness (initial inflation) Test

The test tire was mounted on the rim using the hydraulic tire changer or by hand and then while the tire was held uprightly, air was supplied to the inside of the tire through the valve to examine whether the tire could be inflated or not. The results are shown in Table 1 wherein "Y" indicates that the tire could be inflated, and "N" indicates "could not".

3) Toe damage test

After the rim mounting operation was made using the hydraulic tire changer, irrespective of whether the tire was mounted or not, the bead toe was checked for chip. The results are shown in Table 1.

TABLE 1

| Tire | Ex. A1 | Ex. B1 | Ref. A1 | Ref. A2 | Ref. B1 | Ref. B2 | Prior A1 | Prior B1 |
|---|---|---|---|---|---|---|---|---|
| Tire size | 295/80R22.5 | 245/70R19.5 | 295/80R22.5 | 295/80R22.5 | 245/70R19.5 | 245/70R19.5 | 295/80R22.5 | 245/70R19.5 |
| Rim size | 9.00 × 22.5 | 7.5 × 19.5 | 9.00 × 22.5 | 9.00 × 22.5 | 7.5 × 19.5 | 7.5 × 19.5 | 9.00 × 22.5 | 7.5 × 19.5 |
| Bead base surface *1 | S | S | S | S | S | S | W | W |
| Taper angle θ (deg) | 23.8 | 23.6 | 21.5 | 28.7 | 21.5 | 27.3 | | |
| W-taper angle (deg) | | | | | | | 21/31.5 | 21/31.5 |
| Axial width La (mm) | 25.4 | 24 | 22 | 29.8 | 20.9 | 28.1 | 24.1 | 20.9 |
| Maximum bead core width Lb (mm) | 18.5 | 17 | 18.5 | 18.5 | 17 | 17 | 18.5 | 17 |
| La/Lb | 1.37 | 1.41 | 1.19 | 1.61 | 1.22 | 1.65 | 1.3 | 1.22 |
| Min. rubber thickness t (mm) | 2.2 | 2.3 | 1.2 | 2.6 | 1.4 | 2.8 | 1.4 | 1.3 |
| Rim mounting | | | | | | | | |
| new | Y | Y | N | N | N | N | Y | Y |
| old | Y | Y | N | N | N | N | Y | Y |
| Airtightness (Initial inflation) | | | | | | | | |
| new | Y | Y | N | Y | N | Y | Y | Y |
| old | Y | Y | N | Y | N | Y | N | N |
| Bead toe damage | | | | | | | | |
| new | none | none | exist | none | exist | none | exist | exist |

*1 S = single taper, W = double taper
"new" means the running distance of the tire was zero.
"old" means the running distance reached to 50,000 km.

Figure 3:
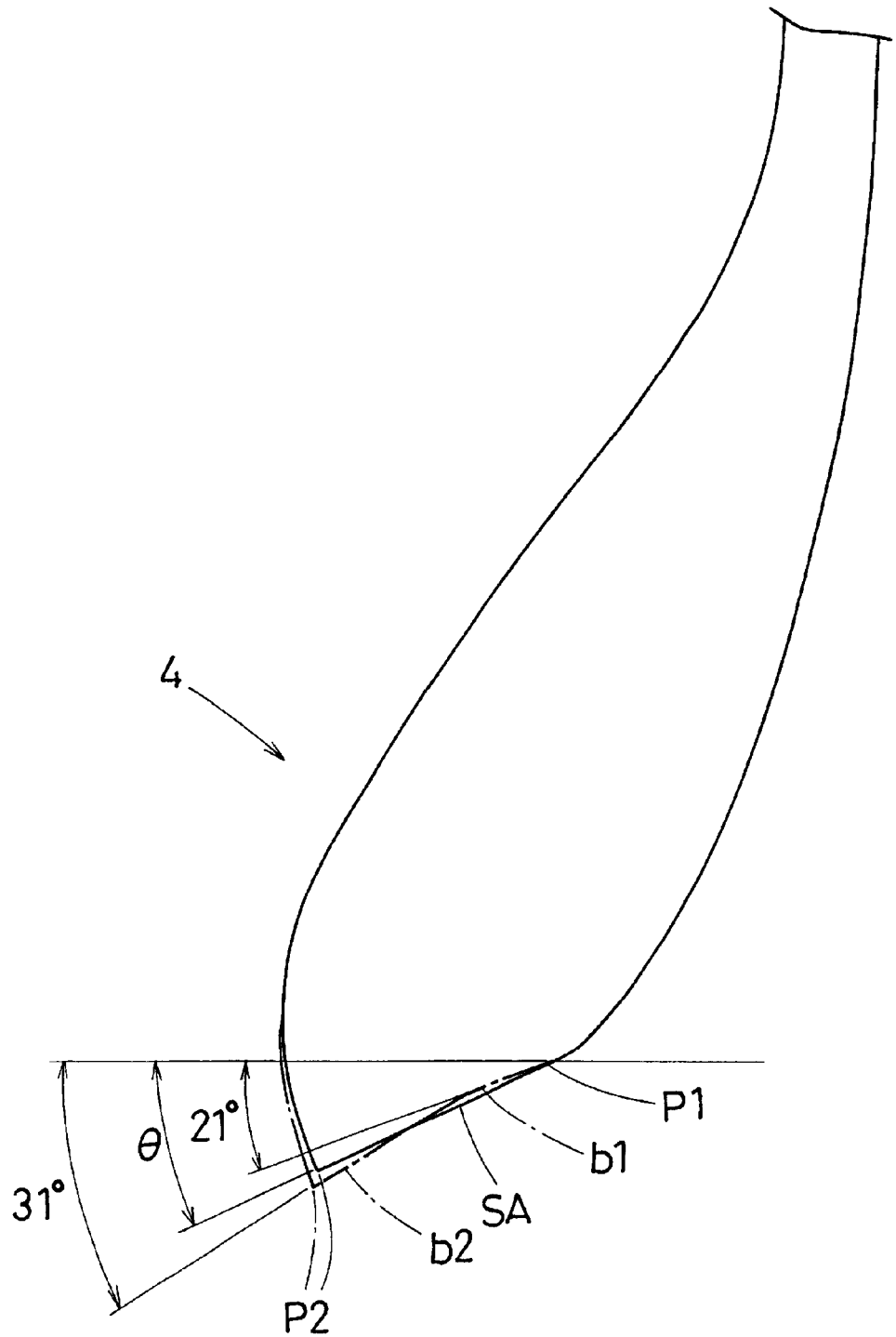
FIG. 3 shows a profile of the bead portion thereof together with a profile according to a prior art in an overlapped manner.

Therefore, the bead base surface SA is, as shown in FIG. 3, inclined at the angle θ between the double-taper angles of the gently inclined part b1 and steeply inclined part b2 in the prior art construction. As a result, a part on the bead heel side can serve sufficient contact for initial tire inflation. On the other hand, as the inside diameter at the bead toe P2 is increased, it becomes easier for the bead toe to go over the wheel rim flange. Thus, rim mounting and bead toe damage can be improved.

If the angle θ is less than 22 degrees, it becomes difficult to control cracks. If more than 26 degrees, it becomes

What is claimed is:

1. A pneumatic tire to be mounted on a 15-degree-taper rim, comprising
   a tread portion,
   a pair of sidewall portions,
   a pair of bead portions each with a bead core therein,
   a carcass comprising a ply of steel cords, wherein
      in a meridian section of the tire under a state that the tire is not mounted on a rim but the bead portions are held such that the bead width is equal to the rim width of said 15-degree-taper rim, the bead base surface of each said bead portion, which is defined as extending between a bead heel and a bead toe, is substantially straight and inclined at an angle of from 22 to 26 degrees with respect to the tire axial direction, and a ratio La/Lb of the axial width La of the bead base surface to the maximum width Lb of the bead core is in a range of from 1.3 to 1.6.

2. A pneumatic tire according to claim 1, wherein said angle is in a range of from 23 to 25 degrees.

3. A pneumatic tire according to claim 1 or 2, wherein the carcass consists of said ply.

4. A pneumatic tire according to claim 1 or 2, wherein beneath the bead core in each of the bead portions, a minimum of the rubber thickness between the bead base surface and the adjacent cords is in a range of from 1.8 to 3.3 mm.

* * * * *